F. H. MERRILL
Stove Pipe.
No. 90,862.
Patented June 1, 1869.
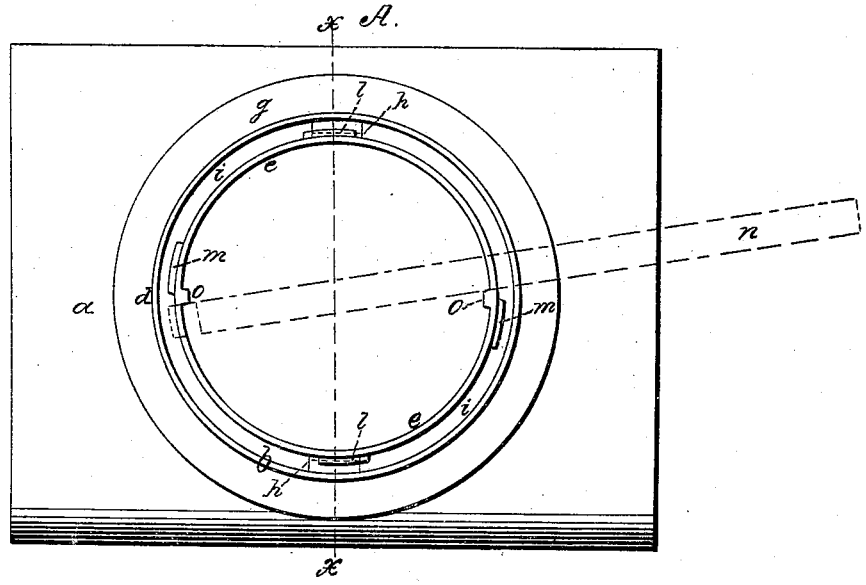
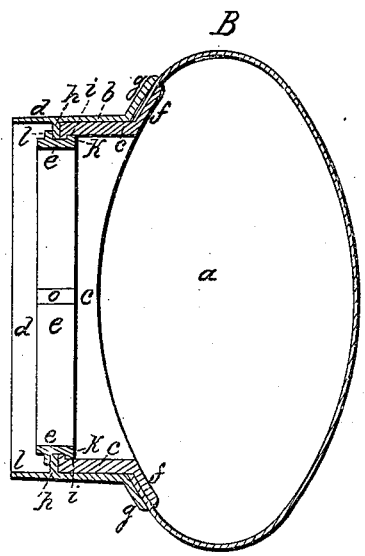
Witnesses:
H. S. Miller
D. P. Cowl
Inventor:
F. H. Merrill
by his attys
Crosby Halsted & Gould

United States Patent Office.

FRANK H. MERRILL, OF CAPE ELIZABETH, MAINE.

*Letters Patent No. 90,862, dated June 1, 1869.*

---

IMPROVEMENT IN ATTACHING COLLARS FOR STOVE-PIPES.

---

The Schedule referred to in these Letters Patent and making part of the same.

---

*To all whom it may concern:*

Be it known that I, FRANK H. MERRILL, of Cape Elizabeth, in the county of Cumberland, and State of Maine, have invented an Improvement in Attaching Collars for Stove-Pipes; and I do hereby declare that the following, taken in connection with the drawings which accompany and form part of this specification, is a description of my invention, sufficient to enable those skilled in the art to practise it.

In running a horizontal elbow from a vertical pipe connected with a stove, or from the vertical sheet-iron casing of a stove, it is customary to use a flanged cast-metal ring or collar, which fits over the pipe, or which itself makes the elbow, while the flange fits against the surface of the pipe or stove, said flange being riveted, bolted, or screwed to the stove-pipe.

The labor attending the fastening of the collar in place, and the employment of the rivets, screws, or bolts, have led me to devise a means of connection, whereby such fastenings are entirely dispensed with; and My invention consists in a collar, having inner and outer flanged rings, connected together, without the employment of fastenings extending through the flanges, the connector being preferably a clamp-ring, the flange of the inner collar-ring fitting upon the inner surface of the pipe, and the flange of the outer ring, upon the outer surface thereof, so that by clamping the two rings together, the collar is attached to the pipe, or to a stove, without rivets or similar fastenings, and without necessity of cutting through the pipe or stove, for connection of the elbow thereto, any other hole than the flue-hole, to lead into the elbow.

The drawings represent a collar embodying my invention.

A shows the collar in elevation, applied to a stove-pipe.

B is a section, on the line $x\ x$.

$a$ denotes the stove-pipe, which may be circular, oval, or of any other form, in section.

$b$, the cast-metal collar, by which the pipe is to be fastened to an elbow, for connecting the pipe with a stove, or with another pipe.

This collar is shown as composed of three parts, namely, an inner ring, $c$, an outer ring, $d$, and a connecting-ring, $e$.

The cylindrical part of the ring $c$ fits into and projects through the hole cut through the pipe, where the connection is to be made, and the ring has a flange, $f$, projecting outward from it, this flange being formed in casting, to fit the inner surface of the pipe, as seen at B.

Around the ring $c$, the outer ring $e$ is placed, this ring also having an outwardly-projecting flange, $g$, which fits upon the outer surface of the pipe, as seen at B, the pipe adjacent to the edge of the hole being embraced between the two flanges $f\ g$.

The outer ring $d$ extends outwardly some distance beyond the end of the ring $e$, and has cast upon its inner surface, two or more lips, or projections, $h$, which extend in over the edge of the ring $e$, as seen in the drawings.

The ring $e$ has an inwardly-projecting lip, $i$, extending partially around it, and under this lip, an outwardly-projecting flange, $k$, on the ring $e$, extends, the ring $e$ being passed into the ring $d$ from within.

The ring $e$ also has lips or projections $l$, extending from its outer surface.

In connecting the collar to the pipe, or to a stove-plate, the ring $d$, placed on the outer side of the pipe or plate, around the flue-hole and the ring $c$, is thrust through the hole into the ring $d$.

The rings being then temporarily held in position, the clamp-ring $e$ is passed into the inner ring from the inside of the pipe, its projections $l$ being slipped through slots $m$, cut in the flange or lip $i$, of the collar-ring $c$, bringing the lips or flanges $i\ h$ into contact.

The clamp-ring $e$ is then turned until its lips or projections $l$ slide over the lips or projections $h$ of the outer ring or collar $d$.

The projections $l$ and $h$ are both inclined on their abutting surfaces, and as the lips $l$ ride over the lips $h$, the rings $c\ d$ are clamped together, and to the pipe or stove-plate, the clamp being tightened by turning the ring $e$, and forcing the projections $l$ over the projections $h$, as will be readily understood.

In thus connecting the parts, and in disconnecting them, a lever, $n$, may be used, said lever being bent so as to take hold of two projections $o$, extending from the ring $e$.

It will readily be seen that collars thus made can be very readily and rapidly applied or disconnected without the aid of a skilled workman, and without the employment, in any way, of bolts, rivets, or screws.

The construction of the parts may be materially modified without departure from the essential features of my invention, and in applying the collar to a flat plate, the ring $f$ may be dispensed with, lips upon the inner ring slipping directly over lips upon the outer ring, by turning either with respect to the other.

I claim the combination of the inner and outer flanged rings, clamped together, without the employment of rivets, or equivalent fastening-devices, substantially as described.

FRANK H. MERRILL.

Witnesses:
 FRANCIS GOULD,
 S. B. KIDDER.